(12) United States Patent
Hoose, Jr.

(10) Patent No.: US 9,341,165 B2
(45) Date of Patent: May 17, 2016

(54) POWER GENERATION SYSTEM AND METHOD OF USE THEREOF

(71) Applicant: Howard G. Hoose, Jr., Feura Bush, NY (US)

(72) Inventor: Howard G. Hoose, Jr., Feura Bush, NY (US)

( * ) Notice: Subject to any disclaimer, the term of this patent is extended or adjusted under 35 U.S.C. 154(b) by 691 days.

(21) Appl. No.: 13/721,782

(22) Filed: Dec. 20, 2012

(65) Prior Publication Data

US 2014/0175798 A1    Jun. 26, 2014

(51) Int. Cl.
*F04D 27/02* (2006.01)
*F03G 7/00* (2006.01)

(52) U.S. Cl.
CPC . *F03G 7/00* (2013.01); *F04D 27/02* (2013.01)

(58) Field of Classification Search
CPC ............... F03G 7/04; F03B 1/02; F03B 1/04; F03B 11/02; F03B 13/06; F05D 2260/60; F05D 2260/601
USPC ............... 415/202, 6, 8, 11, 66, 67, 183, 184, 415/211.2, 220, 223; 290/43, 54; 417/122, 417/123, 124, 125; 137/527
See application file for complete search history.

(56) References Cited

U.S. PATENT DOCUMENTS

| | | | | |
|---|---|---|---|---|
| 1,377,776 A | * | 5/1921 | Fiscel | F04F 1/06 417/123 |
| 1,862,407 A | * | 6/1932 | Keith | E03B 5/06 417/122 |
| 3,901,033 A | * | 8/1975 | McAlister | F16H 43/00 60/516 |
| 3,939,356 A | | 2/1976 | Loane | |
| 4,086,765 A | * | 5/1978 | Gillilan | F03B 13/00 417/125 |
| 4,443,707 A | | 4/1984 | Scieri et al. | |
| 4,660,379 A | * | 4/1987 | Lane | F03B 17/00 60/326 |
| 5,697,767 A | | 12/1997 | Bissell et al. | |
| 7,579,700 B1 | * | 8/2009 | Meller | F03B 17/005 290/1 A |
| 7,952,219 B2 | | 5/2011 | Riley | |
| 2004/0237525 A1 | * | 12/2004 | Stock | F01K 21/005 60/645 |
| 2005/0198960 A1 | | 9/2005 | Marnoch | |
| 2006/0059912 A1 | | 3/2006 | Romanelli et al. | |
| 2010/0077749 A1 | | 4/2010 | Riley | |

(Continued)

FOREIGN PATENT DOCUMENTS

RU    2023907 C1    11/1994
RU    2214430 C1    10/2003

OTHER PUBLICATIONS

International Search Report and Written Opinion for corresponding PCT application PCT/US2013/069661 mailed Feb. 27, 2014.

*Primary Examiner* — Dwayne J White
*Assistant Examiner* — Jason Mikus
(74) *Attorney, Agent, or Firm* — Tech Valley Patent, LLC; John Pietrangelo

(57) ABSTRACT

A power generation system comprising a first vessel, a second vessel, a pump operably connected to the first vessel and the second vessel, and a turbine manifold assembly operably connected to the first vessel and the second vessel, wherein the pump creates a positive pressure in the first vessel to force a fluid in a first direction through the turbine manifold assembly and into the second vessel to a pre-determined level by a negative pressure in the second vessel, wherein, once the fluid reaches the pre-determined level in the second vessel, the pump creates a positive pressure in the second vessel to force the fluid in an opposing second direction through the turbine manifold assembly and back into the first vessel by a negative pressure in the first vessel to complete a cycle is provided. Furthermore, associated methods and a turbine manifold assembly is also provided.

21 Claims, 9 Drawing Sheets

(56) References Cited

U.S. PATENT DOCUMENTS

| | | |
|---|---|---|
| 2010/0253080 A1 | 10/2010 | DeAngeles |
| 2010/0278629 A1* | 11/2010 | Krippene ............. F03D 1/04 415/1 |
| 2011/0027107 A1 | 2/2011 | Bekken |

* cited by examiner

POWER GENERATION SYSTEM AND METHOD OF USE THEREOF

FIELD OF TECHNOLOGY

The following relates to a power generation system, and more specifically to embodiments of power generation system using positive and negative pressure.

BACKGROUND

Energy and power generation is a necessity in today's global market, and most current methods, such as oil, gas, and coal can be harmful to the environment, but are certainly limited in total available resource. Over the past few decades, the world has been striving to develop cleaner and more efficient methods of energy production and consumption to reduce costs associated with energy production and consumption. However, the United States and other countries are still dependent on conventional methods of power generation.

Thus, a need exists for an apparatus and method for a power generation system and method that utilize a pressurized, contained system.

SUMMARY

A first aspect relates generally to a turbine manifold assembly comprising a turbine, a first directional flow valve in fluid communication with the turbine, and a second directional flow valve in fluid communication with the turbine, wherein the first directional flow valve cooperates with the second directional flow valve to create: a first pathway for a fluid to enter a first vessel in a first direction, and a second pathway for fluid to enter a second vessel in an opposing second direction, wherein the turbine continuously rotates in a single direction as the fluid moves through the first pathway and the second pathway.

A second aspect relates generally to a power generation system comprising a first vessel, a second vessel, a pump operably connected to the first vessel and the second vessel, and a turbine manifold assembly operably connected to the first vessel and the second vessel, wherein the pump creates a positive pressure in the first vessel to force a fluid in a first direction through the turbine manifold assembly and into the second vessel to a pre-determined level by a negative pressure in the second vessel, wherein, once the fluid reaches the pre-determined level in the second vessel, the pump creates a positive pressure in the second vessel to force the fluid in an opposing second direction through the turbine manifold assembly and back into the first vessel by a negative pressure in the first vessel to complete a cycle.

A third aspect relates generally to a power generation system comprising a first vessel, a second vessel, a first pump operably connected to the first vessel, a second pump operably connected to the second vessel, and a turbine manifold assembly operably connected to the first vessel and the second vessel, wherein the first pump creates a positive pressure in the first vessel to force a fluid in a first direction through the turbine manifold assembly and into the second vessel to a pre-determined level by a negative pressure in the second vessel created by the second pump, wherein, once the fluid reaches the pre-determined level, a positive pressure is created in the second vessel by the second pump to force the fluid in a second direction through the turbine manifold assembly and back into the first vessel by a negative pressure in the first vessel created by the first pump to complete a cycle.

A fourth aspect relates generally to a method of power generation comprising utilizing a positive pressure and a negative pressure in a contained system to create a continuous flow of a fluid in a first direction and an opposing second direction to generate an electrical current, wherein the continuous flow of the fluid in the first direction and the opposing second direction rotates a turbine in a single direction to generate the electrical current.

A fifth aspect relates generally to a method of power generation comprising providing a first vessel, a second vessel, a pump, and a turbine manifold assembly, wherein the first vessel and the second vessel are operably connected to the turbine manifold assembly, creating a positive pressure in the first vessel and a negative pressure in the second vessel to force a fluid in a first direction through the turbine manifold assembly and into the second vessel to a pre-determined level, and after the fluid reaches the pre-determined level in the second vessel, creating a positive pressure in the second vessel and a negative pressure in the first vessel to force the fluid in an opposing direction through the turbine manifold assembly and back into the first vessel to complete a cycle.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
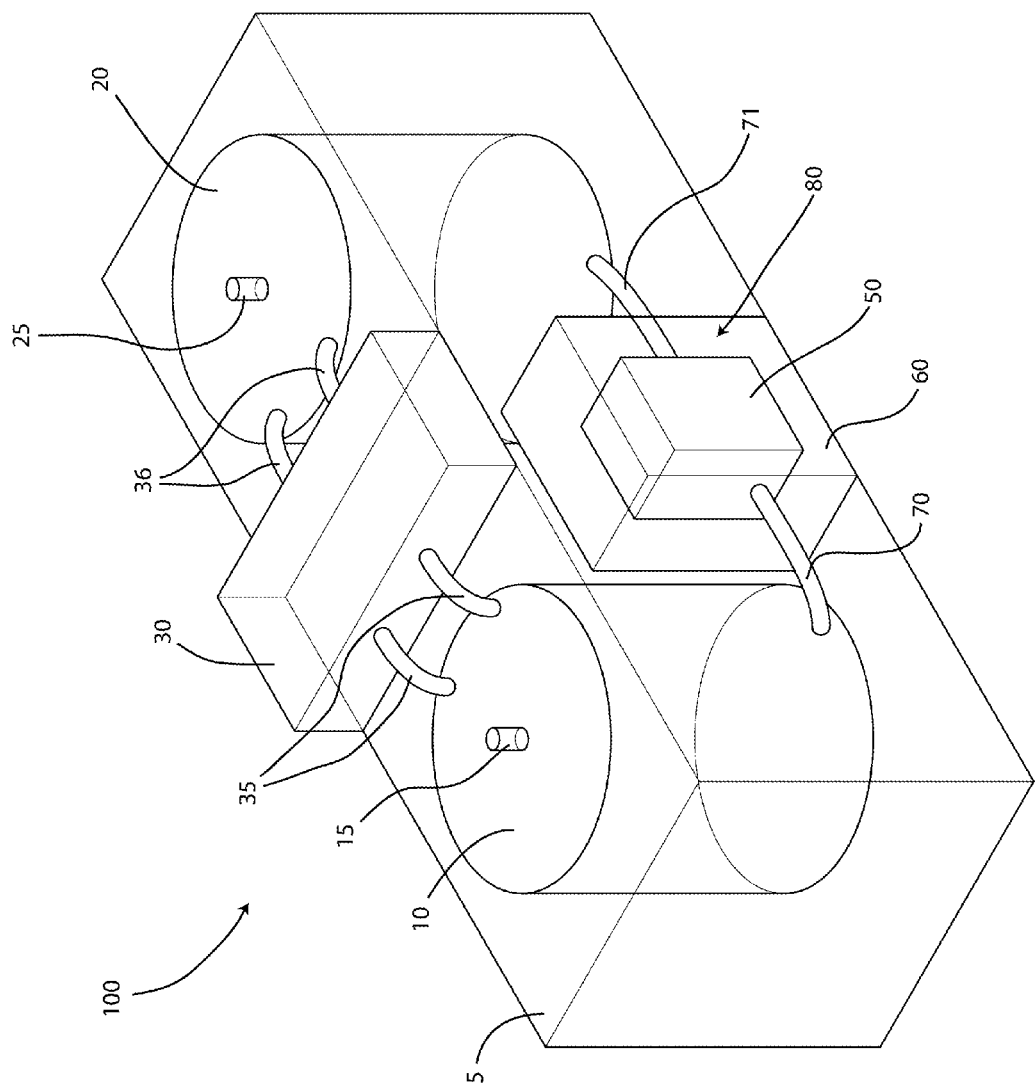
FIG. 1 depicts a perspective view of a first embodiment of a power generation system.
Figure 2:
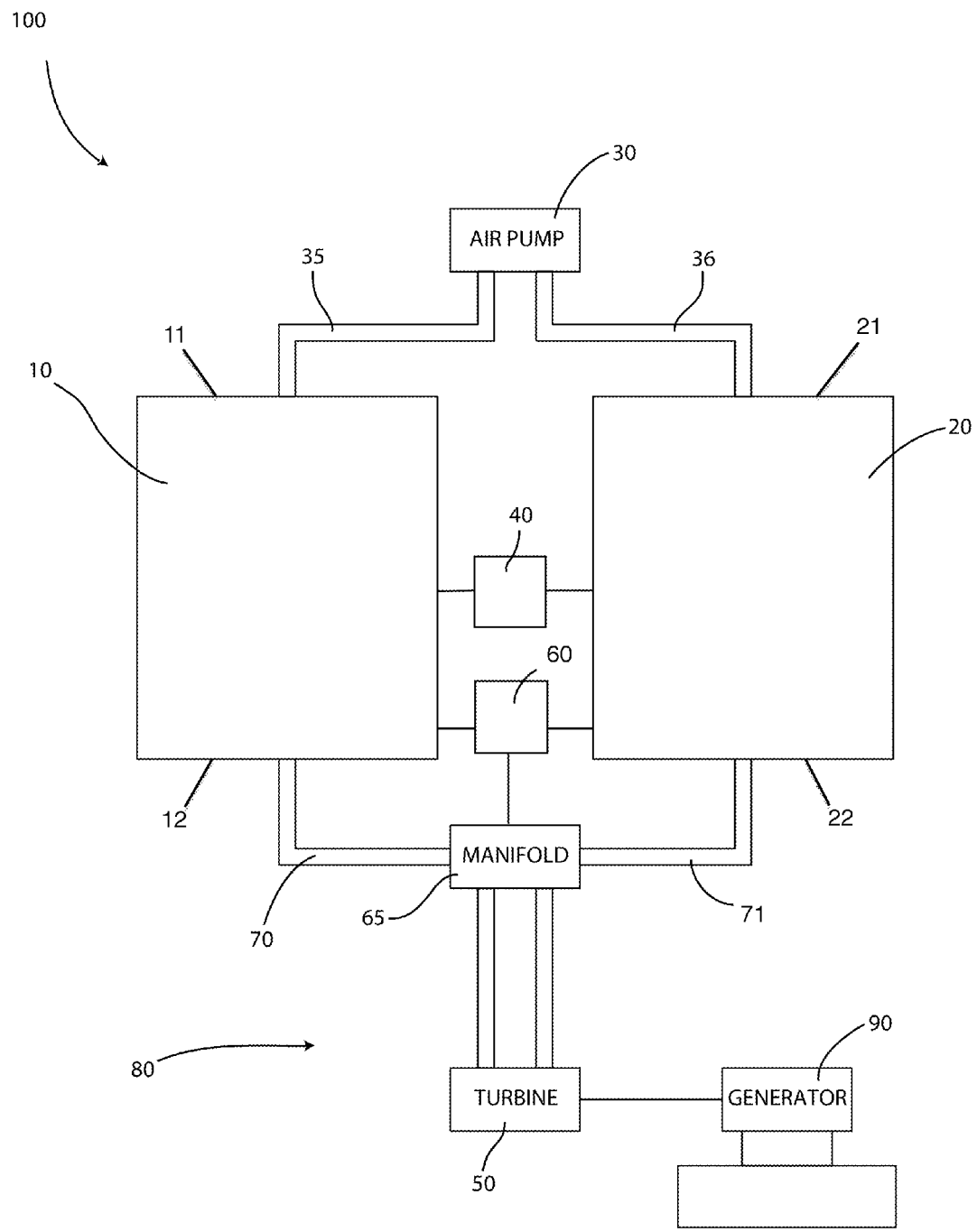
FIG. 2 depicts a schematic view of the first embodiment of the power generation system.

Referring to the drawings, FIGS. 1 and 2 depict an embodiment of a power generation system 100. Power generation system 100 may generate electricity through a continuous movement of fluid through the components of the power generation system 100. For instance, embodiments of the power generation system 100 may utilize a continuous flow of fluid through a turbine manifold assembly to actuate a power generator, such as a turbine, wherein the system 100 can be a contained, pressured, system. Furthermore, system 100 and all or some of its components may be in communication with each other through a computing system, and may be connected to a network for internet access, remote operation, etc. Embodiments of system 100 may include a first vessel 10, a second vessel 20, a pump 30, and a turbine manifold assembly 80, which may utilize a negative and a positive pressure in a pressurized, contained system to continuously rotate the turbine 50 for power generation.

Embodiments of the power generation system 100 may include first vessel 10. Embodiments of a first vessel 10 may be a container, a tank, a reservoir, receptacle, basin, bottle, an air-controlled vessel, and the like, configured to hold, store, contain, accept, etc., a volume of a fluid. The size, thickness, and dimension of the first vessel 10 may depend on the application, such as the desired output of the turbine, or comparable power generator, and the pressure produced within the vessel 10. For instance, embodiments of the first vessel 10 may have various shapes and cross-sections, such as circular, rectangular, cylindrical, egg-shaped, and the like, to prevent collapse or explosion of the vessel 10. Moreover, embodiments of the first vessel 10 may be sealed and pressurized. Embodiments of the first vessel 10 may be comprised of various materials, such as conductive and non-conductive materials, metals, composites, hard plastics, and the like, that are capable of pressurization and general withstanding of dynamic loads produced by the flowing fluids moving through the first vessel 10. Furthermore, embodiments of the first vessel 10 may have a first end 11 and a second end 12. The first end 11 may be in closer proximity to a pump 30 of system 100 than the second end 12, while the second end 12 may be in closer proximity to a turbine manifold assembly 80 of system 100. Embodiments of the first vessel 10 may further include a switch 15 proximate, at, or otherwise near the first end 11 of the first vessel 10 to monitor, sense, detect, determine, etc. a fluid level within the first vessel 10, wherein the switch 15 may be configured to actuate the pump 30 or other component(s) of system 100. Alternatively, or in addition to the switch 15, embodiments of the first vessel may include one or more sensors within the first vessel 10 to monitor, detect, control, report, analyze, etc. data about the fluid within the system 100, including the first vessel 10, such as a fluid level. The sensor(s) could also be configured to actuate the pump 30, or other component(s) of system 100. Even further, embodiments of the first vessel 10 may be equipped with a vacuum and pressure gauge to determine, monitor, and control the amount of positive and negative pressure within the first vessel 10, wherein the gauges(s) are in communication (e.g. over computer network) with other sensors, gauges, switches, and the like of the system 100.

Figure 3:
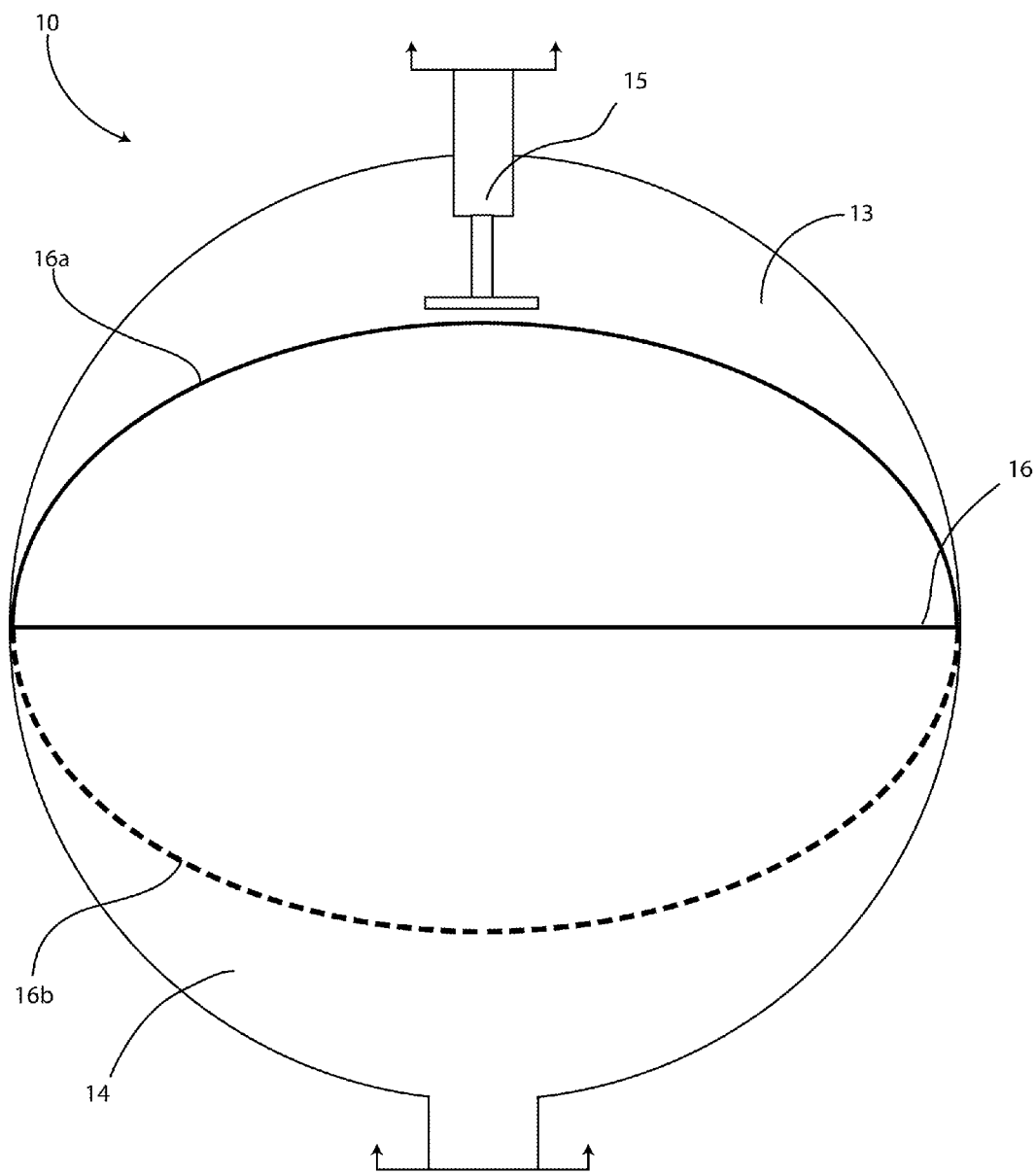
FIG. 3 depicts a schematic view of an embodiment of a first vessel having a first embodiment of a separator.
Figure 4:
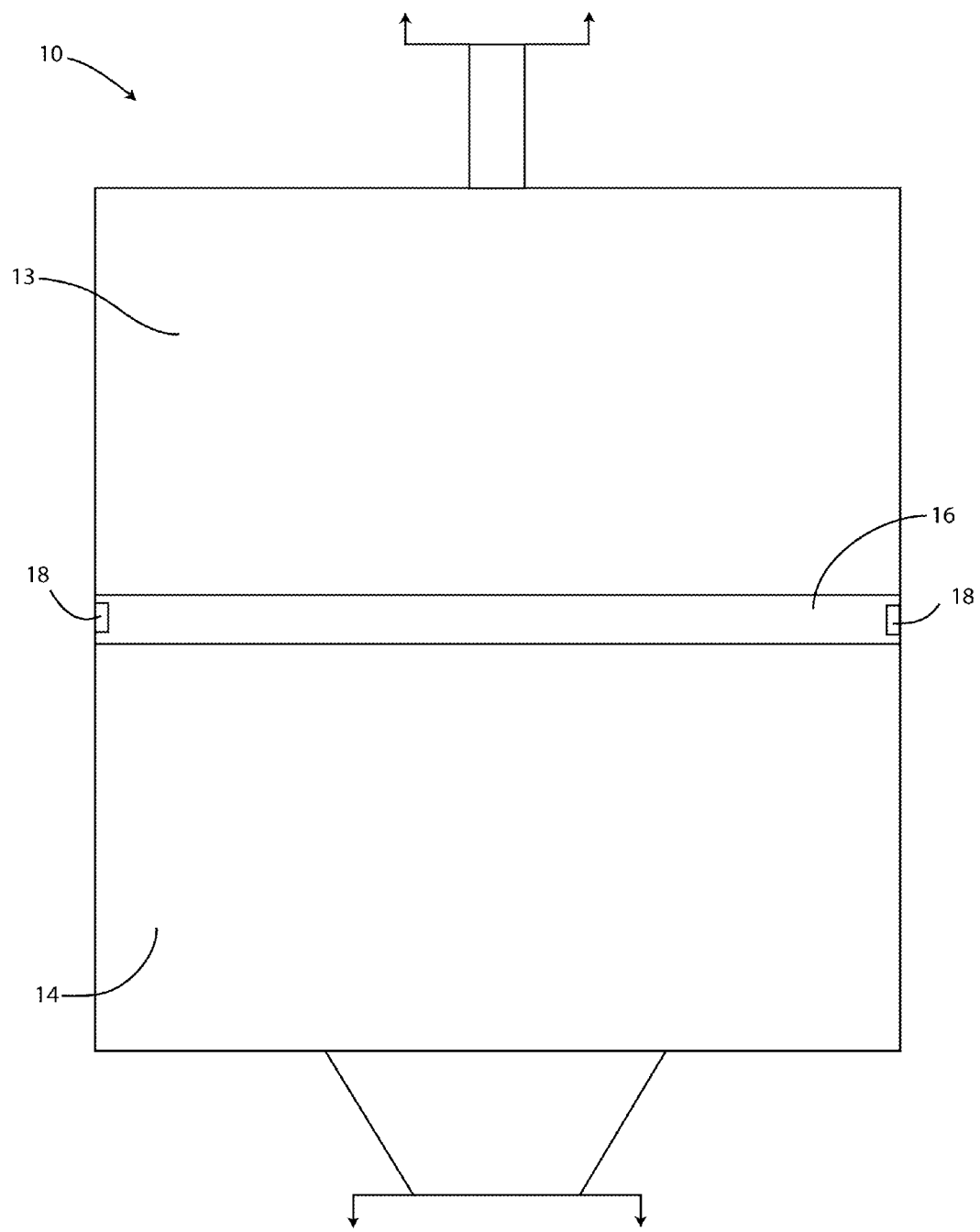
FIG. 4 depicts a schematic view of an embodiment of the first vessel having a second embodiment of the separator.

With continued reference to FIGS. 1 and 2, and additional reference to FIGS. 3 and 4, embodiments of the first vessel 10 may optionally be separated or partitioned into at least two sectors. For example, embodiments of the first vessel 10 may include a first sector 13 and a second sector 14, wherein the first sector 13 and the second sector 14 can be separated by a separator 16. The separator 16 may physically divide, not necessarily equally, the first sector 13 and the second sector 14 to provide further stability and containment of the fluid within the first vessel 10. In a first embodiment, as shown in FIG. 3, the separator 16 may be flexible, such as a rubber material, neoprene, and the like. In this embodiment, as the fluid accumulates in the first vessel 10, the separator 16 may be displaced towards switch 15; position 16*a* depicts an embodiment of the separator 16 expanding due to fluid entering the first vessel 10. Conversely, the separator 16 may displace downward as the fluid is drawn out of the first vessel 10 and the positive pressure is introduced into the first vessel 10; position 16*b* depicts an embodiment of the separator 16 expanding due to the positive pressure entering the first vessel 10. Embodiments of the separator 16 may help prevent the fluid from sloshing around or mixing with the air pressure entering the first vessel 10. In a second embodiment, as shown in FIG. 4, the separator 16 may be rigid or inflexible, such as a metal piston, and displace up and down similar to the flexible separator 16 described above. Specifically, a piston-like embodiment of separator 16 may move upward as fluid enters the first vessel 10, and may move downward as positive pressure is introduced into the first vessel 10. Embodiments of the piston-like separator 16 may include an annular seal or gasket 18 disposed within an annular recess of the separator 16 to create a physical seal between the first sector 13 and the second sector 14 by sealingly engaging the inner surface of the first vessel 10. Embodiments of the seal 18 may be comprised of an elastomeric material to deform against the separator 16 and the inner surface of the first vessel 10.

Referring back to FIGS. 1 and 2, embodiments of the power generation system 100 may include a second vessel 20. Embodiments of a second vessel 20 may be a container, a tank, a reservoir, receptacle, basin, bottle, an air-controlled vessel, and the like, configured to hold, store, contain, accept, etc., a volume of a fluid. The size, thickness, and dimension of the second vessel 20 may depend on the application, such as the desired output of the turbine, or comparable power generator, and the amount of pressure produced within the second vessel 20. For instance, embodiments of the second vessel 20 may have various shapes and cross-sections, such as circular, rectangular, cylindrical, egg-shaped, and the like, to prevent collapse or explosion of the vessel 20. Moreover, embodiments of the second vessel 20 may be sealed and pressurized. Embodiments of the second vessel 20 may be comprised of various materials, such as conductive and non-conductive materials, metals, composites, hard plastics, and the like, that are capable of pressurization and general withstanding of dynamic loads produced by the flowing fluids moving through the second vessel 20. Furthermore, embodiments of the second vessel 20 may have a first end 21 and a second end 22. The first end 21 may be in closer proximity to a pump 30 of system 100 than the second end 22, while the second end 22 may be in closer proximity to a turbine manifold assembly 80 of system 100. Embodiments of the second vessel 20 may further include a switch 25 proximate, at, or otherwise near the first end 21 of the second vessel 20 to monitor, sense, detect, determine, etc. a fluid level within the second vessel 20, wherein the switch 25 may be configured to actuate the pump 30 or other component(s) of system 100. Alternatively, or in addition to the switch 25, embodiments of the first vessel may include a sensor within the second vessel 20 to monitor, detect, control, report, analyze, etc. data about the fluid within the system 100, including the second vessel 20, such as a fluid level. The sensor could also be configured to actuate the pump 30, or other component(s) of system 100. Even further, embodiments of the second vessel 20 may be equipped with a vacuum and pressure gauge to determine, monitor, and control the amount of positive and negative pressure within the second vessel 20, wherein the gauges(s) are in communication with other sensors, gauges, switches, and the like of the system 100.

Figure 5:
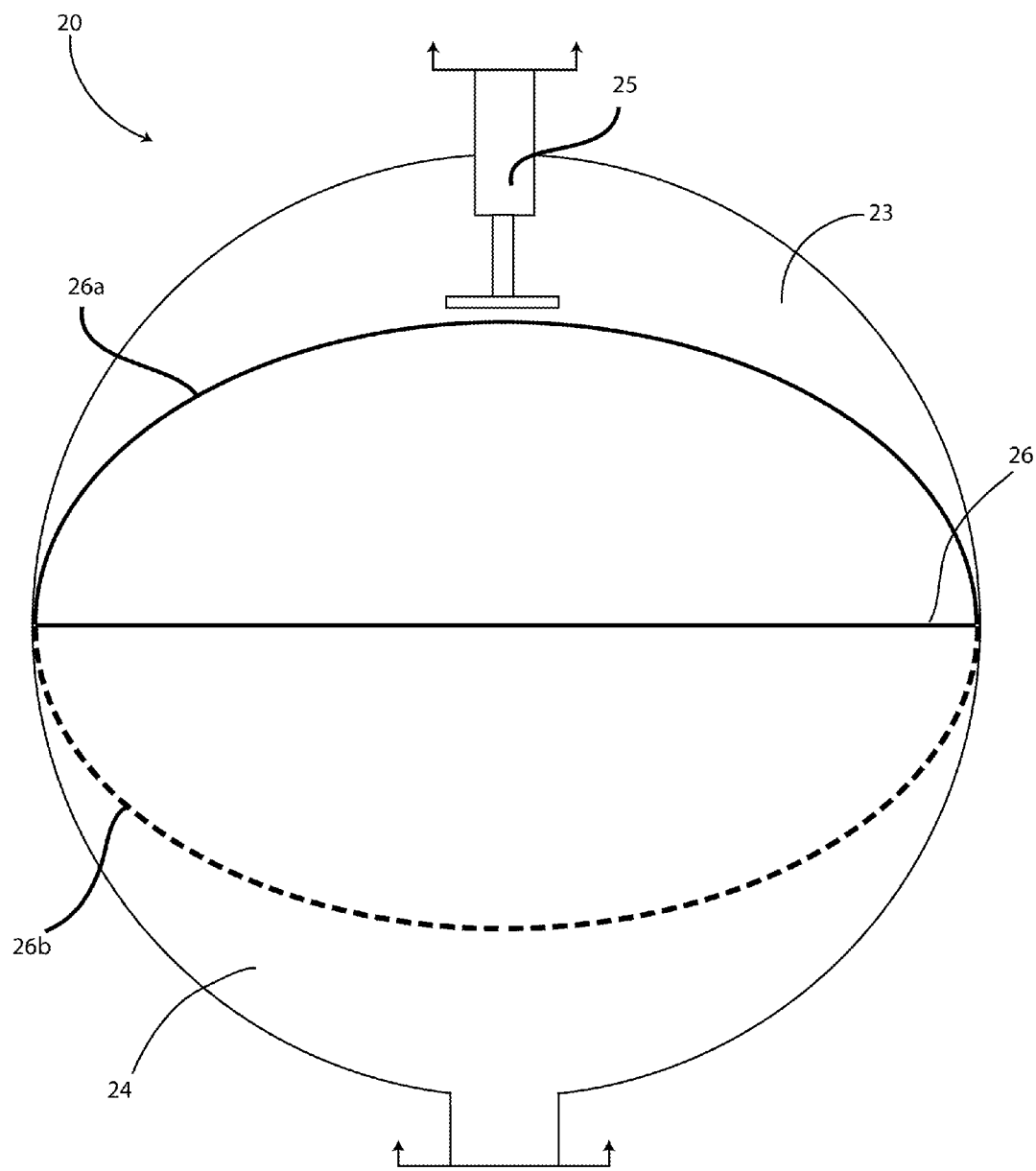
FIG. 5 depicts a schematic view of an embodiment of a second vessel having a first embodiment of the separator.
Figure 6:
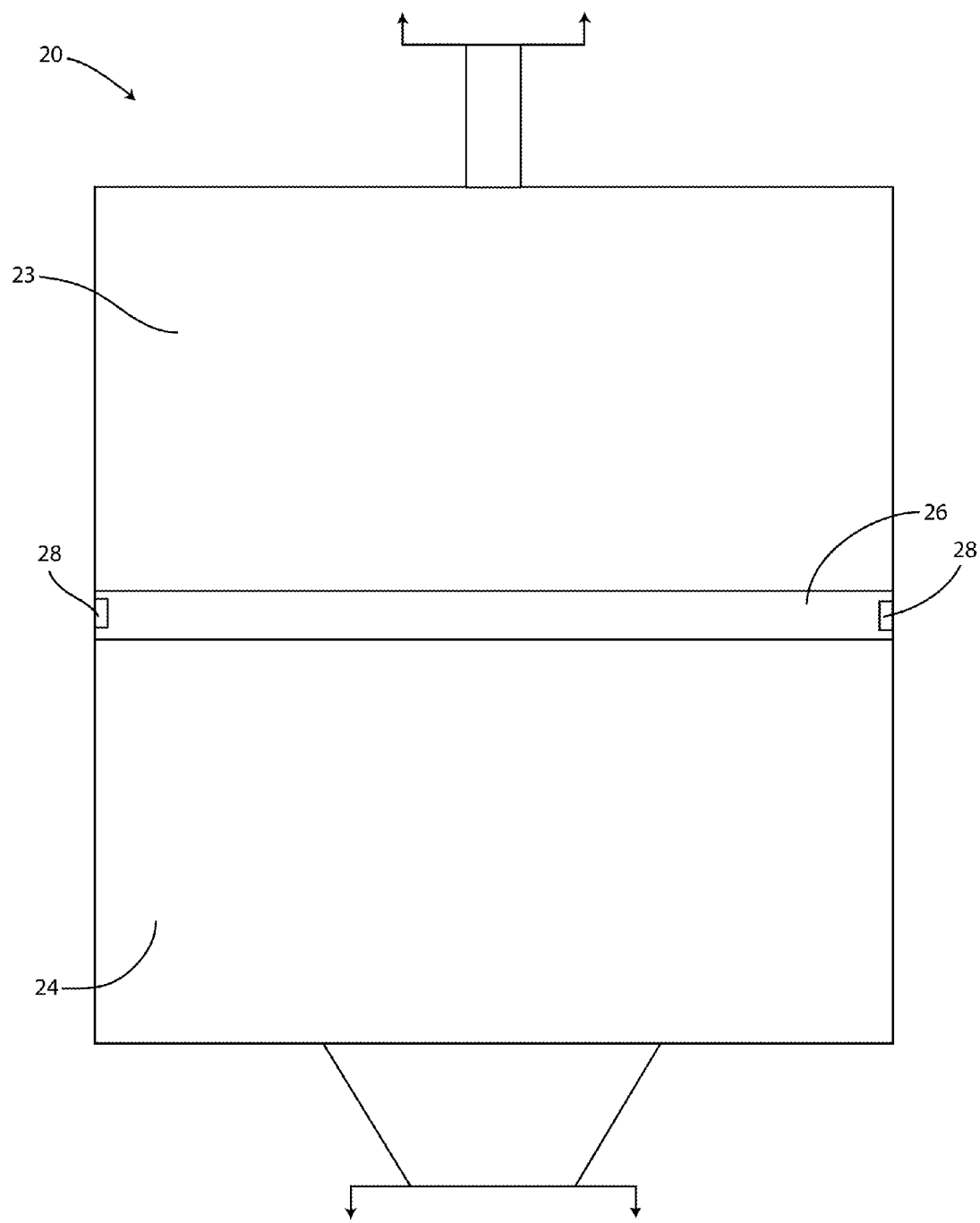
FIG. 6 depicts a schematic view of an embodiment of the second vessel having a second embodiment of the separator.

With continued reference to FIGS. 1 and 2, and additional reference to FIGS. 5 and 6, embodiments of the second vessel 20 may optionally be separated or partitioned into at least two sectors. For example, embodiments of the second vessel 20 may include a first sector 23 and a second sector 24, wherein the first sector 23 and the second sector 24 can be separated by a separator 26. The separator 26 may physically divide, not necessarily equally, the first sector 23 and the second sector 24 to provide further stability and containment of the fluid within the second vessel 20. In a first embodiment, as shown in FIG. 5, the separator 26 may be flexible, such as a rubber material, neoprene, and the like. In this embodiment, as the fluid accumulates in the second vessel 20, the separator 26 may be displaced towards switch 25; position 26a depicts an embodiment of the separator 26 expanding due to fluid entering the second vessel 20. Conversely, the separator 26 may displace downward as the fluid is drawn out of the second vessel 20 and the positive pressure is introduced into the second vessel 20; position 26b depicts an embodiment of the separator expanding due to the positive pressure entering the second vessel 20. Embodiments of the separator 26 may help prevent the fluid from sloshing around or mixing with the air pressure entering the second vessel 20. In a second embodiment, as shown in FIG. 4, the separator 26 may be rigid or inflexible, such as a metal piston, and displace up and down similar to the flexible separator 26 described above. Specifically, a piston-like embodiment of separator 26 may move upward as fluid enters the second vessel 20, and may move downward as positive pressure is introduced into the second vessel 20. Embodiments of the piston-like separator 26 may include an annular a seal or gasket 28 disposed within an annular recess of the separator 26 to create a physical seal between the first sector 23 and the second sector 24 by sealingly engaging the inner surface of the second vessel 20. Embodiments of the seal 28 may be comprised of an elastomeric material to deform against the separator 26 and the inner surface of the second vessel 20.

Furthermore, with reference to FIG. 2, embodiments of system 100 may include a cooling unit 60 operably connected to the first vessel 10, the second vessel 20, and/or the turbine manifold assembly 80 to regulate and maintain a consistent temperature of the fluid. Embodiments of system 100 may further include an accumulator tank 40 to collect an expansion of the fluid due to a temperature change, wherein the accumulator tank may be operably connected to the first vessel 10 and the second vessel 20. Alternatively, one or more accumulator tanks 40 may be independently associated with the first vessel 10 and the second vessel 20.

Referring back to FIGS. 1 and 2, embodiments of the power generation system 100 may include a pump 30. Embodiments of the pump 30 may be any device that can move fluids by a mechanical action. Embodiments of pump 30 may be a direct lift pump, displacement pump, or gravity pump, and may include at least one activating mechanism that either rotates, reciprocates, and/or the like. In an exemplary embodiment, pump 30 is an air pump. Other embodiments of pump 30 may include a hydraulic pump. Furthermore, pump 30 may be powered by conventional means, such as a battery, gasoline engine, and electricity. However, embodiments of pump 30 may be powered through renewable energy sources, such as solar and wind energy. For instance, pump 30 may have an accumulator or other energy storage device to store energy or act as an energy multiplier. Additionally, pump 30 may be equipped with one or more pressure and vacuum gauges to determine and control the proper amount of pressure or vacuum to be created in the first and second vessels 10, 20; the pressure and vacuum gauges may be mechanical or electronic, and may be in communication (e.g. communication through a computer system/network) with the motor of the pump 30 and any other sensor, gauge, switch, or actuator of system 100, 200. For a situation where an operation of the system 100, 200 may need to be halted quickly, pump 30 may also be equipped with one or more safety relief valves to shut down the pump 30 and prevent a further malfunction.

Furthermore, embodiments of pump 30 may be operably connected to the first vessel 10 and the second vessel 20 to provide a positive pressure into the first vessel 10 and a negative pressure into the second vessel 20, and vice versa. In some embodiments, a plurality of pumps 30 may be operably connected to the first and second vessel 10, 20. Operable connection between the pump 30 and the first vessel 10 may be through one or more fluid lines 35. Similarly, operable connection between the pump 30 and the second vessel 20 may be through one or more fluid lines 36. In other words, operable connection between the pump 30 and the first and second vessel 10, 20 may refer to at least a fluid communication between the pump 30 and the first and second vessels 10, 20, respectively, to allow the creating of a positive and a negative pressure in the first and second vessel 10, 20. The fluid communication may be accomplished by the physical connections established by the one or more fluid lines 35, 36. Embodiments of the fluid lines 35, 36 may be pipes, hoses, channels, conduits, fluid pathways, fluid conduits, and the like. Those having skill in the art should appreciate that various grades, sizes, thickness, diameters, industrial strengths, etc. of fluid lines 35, 36 may be required to successfully operate system 100, depending on the size of the vessels 10, 20, the volume of fluid required or used to operate system 100, and the pressure and dynamic loads exerted upon the fluid lines 35, 36. The lines 35, 36 can be structurally connected to pump 30 and the first vessel 10 and the second vessel 20, respectively, through conventional connectors, fasteners, and the like. Moreover, embodiments of the pump 30 may be operably connected to the first vessel 10 through lines 35 proximate or otherwise near the first end 11 of the first vessel 10, and may be operably connected to the second vessel 20 through lines 36 proximate or otherwise near the first end 21 of the second vessel 20. In an exemplary embodiment, the fluid contained in the sealed vessels 10, 20 may never enter the pump 30 or lines 35, 36 because of maximum fluid levels in the vessels 10, 20 that could trigger a switch or electronic signal to shut down system 100, 200.

Figure 7:
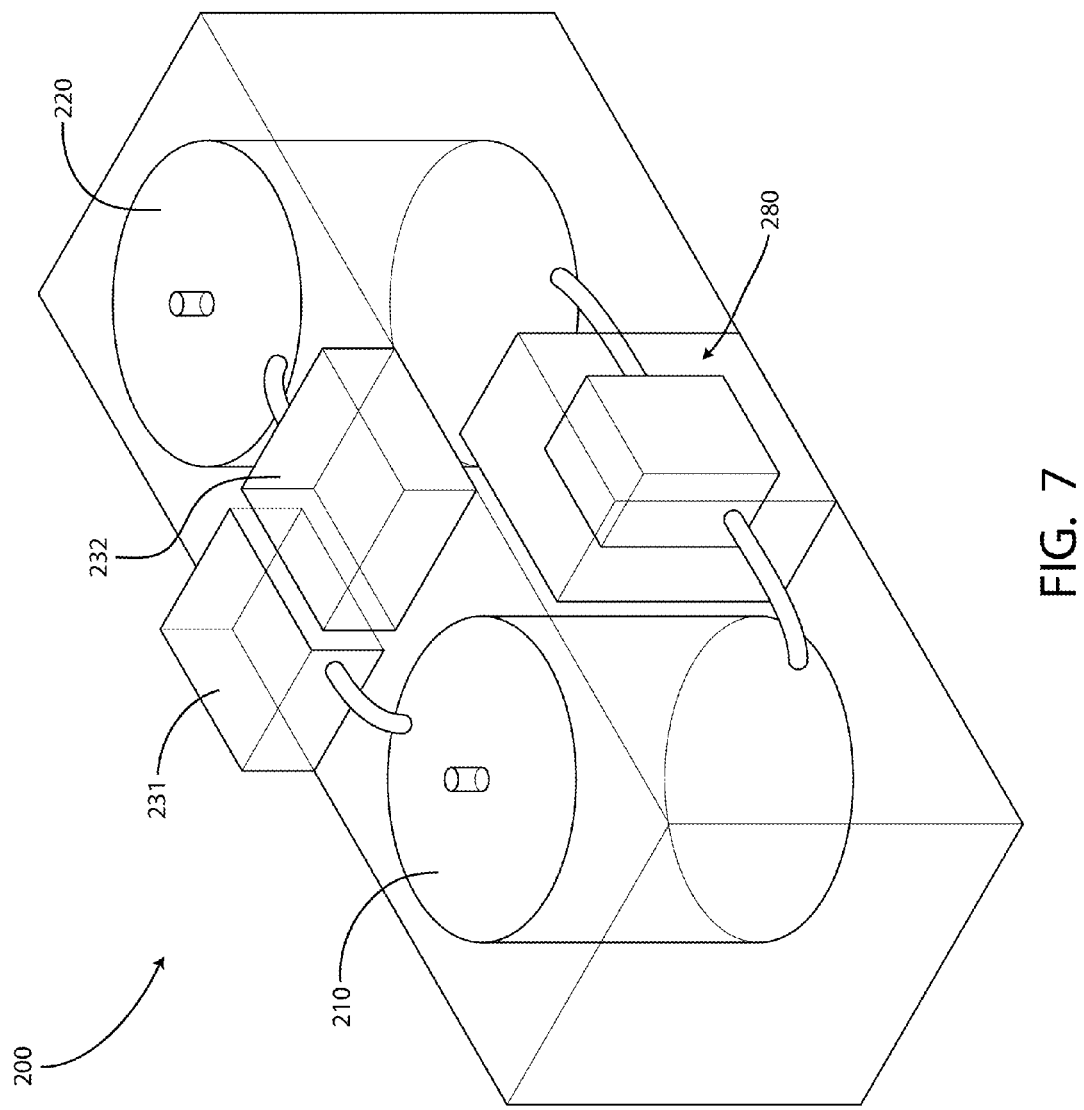
FIG. 7 depicts a perspective view of a second embodiment of the power generation system.
Figure 8:
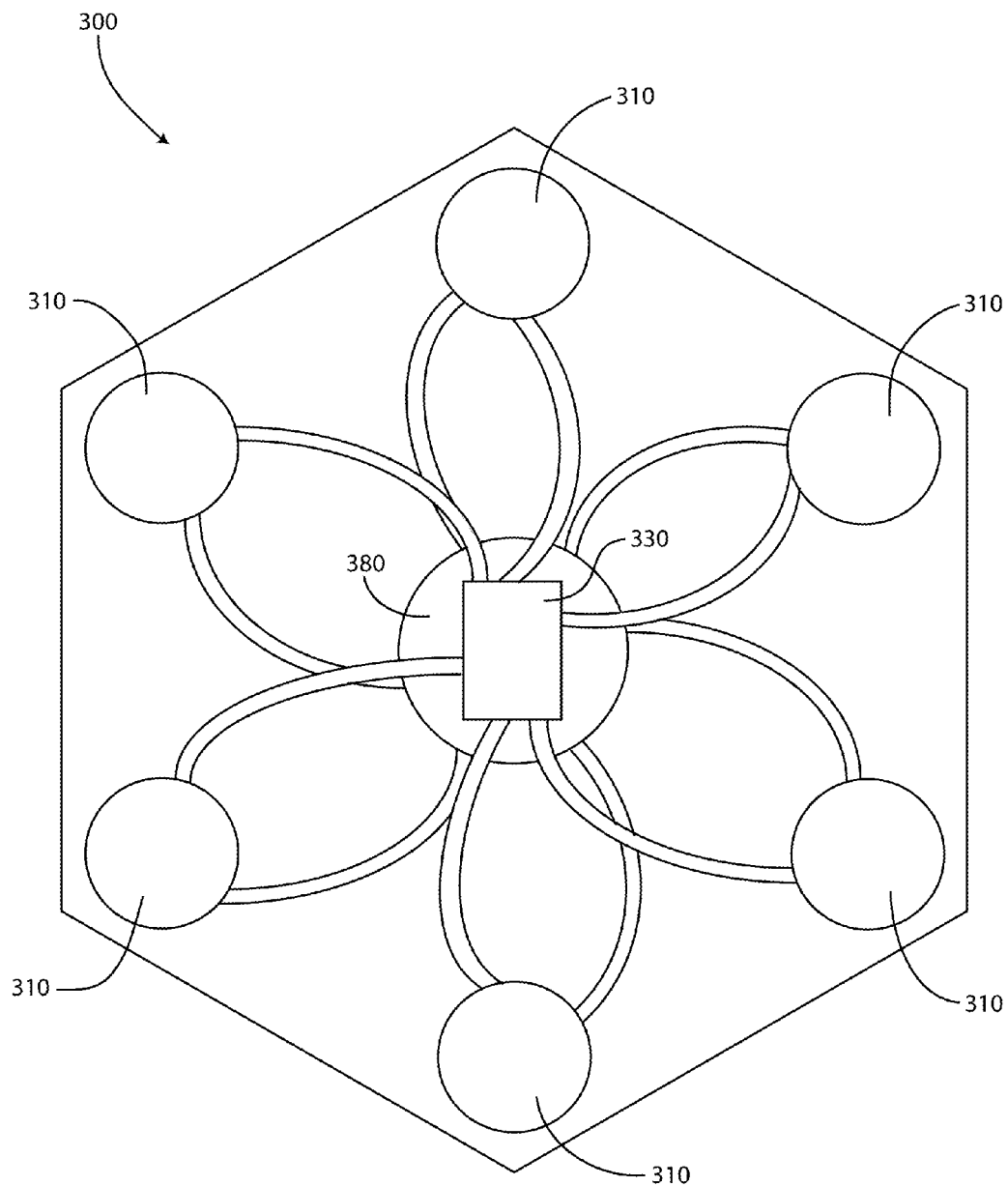
FIG. 8 depicts a schematic view of a third embodiment of the power generation system.

FIG. 7 depicts an embodiment of system 200, wherein two or more pumps, such as pump 30, are independently connected to the first vessel 10 and the second vessel 20. Here, a first pump 231 can be operably connected to the first vessel 210 to provide the positive and negative pressure into the first vessel 210, and a second pump 232 can be operably connected to the second vessel 220 to provide the positive and negative pressure into the second vessel 220. Embodiments of system 200 may further include a turbine manifold assembly 280. FIG. 8 depicts an embodiment of system 300, wherein system 300 includes a plurality of sealed vessels 310, a pump 330, a turbine manifold assembly, and a plurality of fluid lines interconnecting the components. Embodiments of power generation system 100, 200, 300 may be large scale or small scale. An example of a large scale embodiment may be a plurality of sealed vessels located underground proximate or underneath a house or structure and being operably connected to one or more pumps to provide energy for consumption of the inhabitants; any heat given off by the operation of the system 100, 200, 300 may also be captured, stored, and/or delivered to heat a home or other structure. An example of a small scale application could be to run a generator or even charge a cellular phone battery. Further, embodiments of the system 100, 200, 300 could be contained, enclosed, supported, etc. by a frame or housing 5 to even further contain the unit, and ease of transport or installation.

Figure 9A:
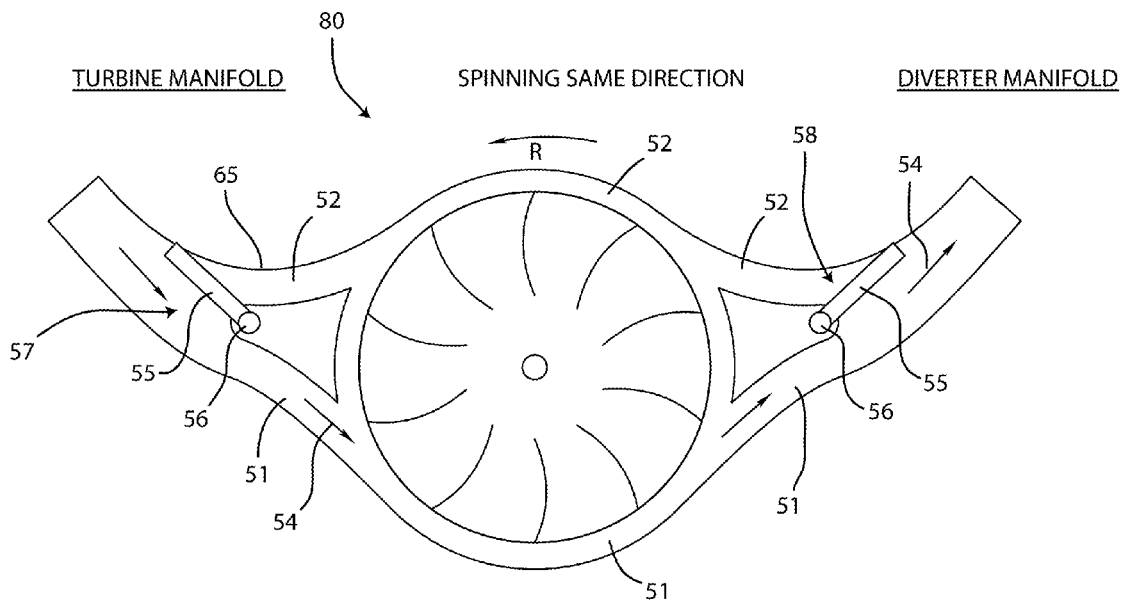
FIG. 9A depicts a schematic view of an embodiment of a turbine manifold assembly spinning in a first direction.
Figure 9B:
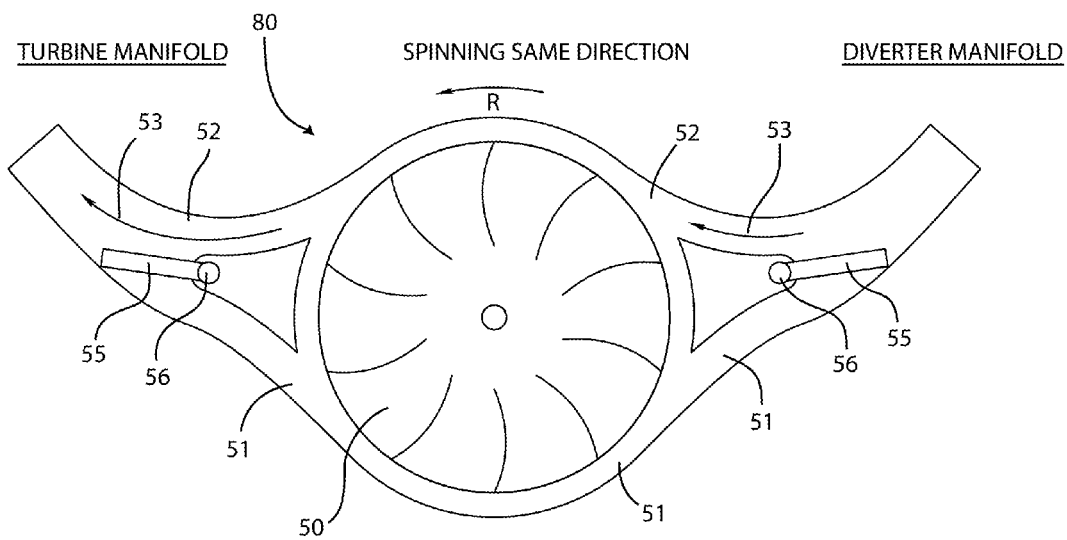
FIG. 9B depicts a schematic view of an embodiment of the turbine manifold assembly spinning in a second direction.

Referring back to FIGS. 1 and 2, and with additional reference to FIGS. 9A and 9B, embodiments of the power generation system 100 may include a turbine manifold assembly 80. Embodiments of the turbine manifold assembly 80 may include a turbine 50, a first directional flow valve 57 in fluid communication with the turbine 50, and a second directional flow valve 58 in fluid communication with the turbine 50. Embodiments of the turbine 50, the first directional flow valve 57 and the second directional flow valve 58 may be housed within a manifold 65, wherein the manifold is a structure having at least one fluid connection to the first vessel 10 and at least one fluid connection to the second vessel 20. Alternatively, the turbine 50 may be operably connected to the manifold 65 but not housed entirely within the manifold 65. Embodiments of the fluid connection between the manifold 65 and the first and second vessel 10, 20 may be one or more fluid lines 70. Embodiments of the fluid lines 70 may be pipes, hoses, channels, conduits, fluid pathways, fluid conduits, and the like. Those having skill in the art should appreciate that various grades, sizes, thickness, diameters, industrial strengths, etc. of fluid lines 70 may be required to successfully operate system 100, depending on the size of the vessels 10, 20, the volume of fluid required or used to operate system 100, and the pressure and dynamic loads exerted upon the fluid lines 70. The lines 70 can be structurally connected to the manifold assembly 65 and the first vessel 10 and the second vessel 20, respectively, through conventional connectors, fasteners, and the like.

Embodiments of the turbine 50 may be a mechanical device that can extract an energy from a fluid flow and can convert it into useful work, including electrical work. Embodiments of turbine 50 may be a turbo machine with at least one moving part called a rotor assembly, which is a shaft or drum with blades attached. Here, moving fluid flowing in a first direction 54 and a second direction 53 acts on the one or more blades of the turbine 50 so that the blades move and impart a rotational energy to the rotor, which may generate an electrical current for output and consumption.

Moreover, embodiments of the first directional flow valve 57 and the second directional flow valve 58 may be a device that regulates, controls, allows and/or prevents a flow of a fluid through the first fluid pathway 51 and the second fluid pathway 52 in either the first direction 54 or the second direction 53. In one embodiment, the first and second directional flow valves 57, 58 may include a biasing member 56, such as a spring or a hinge, to activate a flap portion 55, wherein the flap portion 55 can pivotally move to an open position and a closed position to regulate the flow of the fluid through the turbine manifold assembly 80. Other embodiments of the first and second directional flow valves 57, 58 may be a conventional shut-off valve. Embodiments of the first and second directional flow valves 57, 58 may be hydraulic, pneumatic, solenoid, and/or motor operated.

With continued reference to 9A-9B, embodiments of the first directional flow valve 57 may cooperate with the second directional flow valve 58 to create a first fluid pathway 51 for a fluid to enter the first vessel 10 in a first direction 54, and a second fluid pathway 52 for fluid to enter the second vessel 20 in an opposing second direction 53. Moreover, the turbine 50 may continuously rotate in a single direction R as the fluid moves through the first pathway 51 in the first direction 54 and the second pathway 52 in the second direction 53. In other words, as fluid is drawn out of the first vessel 10 and into the second vessel 20 through actuation of the pump 30, both the first directional flow valve 57 and the second directional flow valve operate to close/prevent the flow of fluid through the first pathway 51 in the first direction 54, as shown in FIG. 9A. Conversely, the operation of the first and second directional flow valves 57, 58 to close/prevent the flow of the fluid through the first pathway 51 opens the flow of the fluid through the second pathway 52 in the second direction 53, as shown in FIG. 9B. This operation may be reversed to complete a cycle, as will be described in greater detail infra.

With reference to FIGS. 1-9B, the manner in which power is generated through operation of the power generation system 100, 200 will now be described. A body or volume of fluid, such as water, air, oil, or a combination thereof, may be pressurized in the system 100, 200. The components of system 100, 200 may be a single, contained, pressured system. The volume of fluid may originally be located, stored, contained, etc., between the first and second vessel 10, 20. In one embodiment, the first or second sealed vessel 10, 20 may be filled to a maximum level, while the other sealed vessel remains empty or at a low fluid level, at the start of a cycle. In other embodiments, each of the first and second sealed vessels 10, 20 are filled with the fluid at approximately equal fluid levels, at the start of the cycle. A cycle can refer to when the fluid has passed once through the turbine 50 in the first direction 54 and then once in the second direction 53 in the turbine manifold assembly 80. However, those skilled in the art should appreciate that a cycle may be measured in a reverse direction, or even by more than one pass through the turbine 50. Moreover, system 100, 200, 300 may incorporate various starting fluid levels in both the first vessel 10 and the second vessel 20, and may set various pre-determined fluid levels during operation.

Once the system 100, 200, 300 is in operational condition (i.e. fluid has been filled in the vessels 10, 20, the turbine 50 is properly connected to a power source generator, etc.), a pump 30, or a plurality of pumps 30, 231 can create a positive pressure in the first vessel 10 or the second vessel 20. For example purposes, the operation of system 100, 200, 300 will be described as first creating a positive pressure in the first vessel 10. Thus, when pump 30 creates a positive pressure in the first vessel 10, the fluid contained within the first vessel 10 is forced/drawn out of the first vessel 10 through lines 70 connecting the first vessel 10 to the turbine manifold assembly 80 and into the manifold 65 through the first fluid pathway 51 in a first direction 54, rotating the turbine 50 in direction R as the fluid passes through, and exiting the manifold 65 through the lines 71 connecting the manifold 65 and the second vessel 20 to a predetermined or maximum fluid level in the second vessel 20. One or more sensors located inside the second vessel 20 or switch 25 of the second vessel 20 may detect the maximum fluid level and/or a predetermined fluid level, such that once the volume of fluid reaches the predetermined or maximum level in the second vessel 20, the one or more sensors and/or switch 25 communicates to the pump(s) 30 to activate and reverse the flow of the fluid by now creating a positive pressure in the second vessel 20 and a negative pressure in the first vessel 10. Creating a positive pressure in the second vessel 20 may now force the fluid at the predetermined level or maximum level from the second vessel 20 through the lines 71 and into the manifold 65 via the second fluid pathway 52 in an opposing second direction 53, rotating the turbine 50 in direction R as the fluid passes through, and exiting the manifold 65 through the lines 70 and re-entering the first vessel to a predetermined or maximum fluid level to complete the cycle. One or more sensors located inside the first vessel 10 and/or switch 15 of the first vessel 10 may detect the maximum fluid level and a predetermined fluid level, such that once the volume of fluid reaches the predetermined or maximum level in the first vessel 10, the one or more sensors and/or switch 15 communicates to the pump(s) 30 to activate and reverse the flow of the fluid by now creating a positive pressure in the first vessel 10 and a negative pressure in the second vessel 20 to restart a new cycle. Further, operation/cooperation of the first and second directional flow valves 57, 58 can ensure, allow, regulate, etc. that the fluid flows in the correct pathways to reach the first and second vessels 10, 20 in the most efficient and least resistant path. Each of the first and second directional flow valves 57, 58 may be in communication (e.g. through a computer system/network) with the switch 15, 25 and/or the one or more sensors to control the mechanical movement of the flow valves 57, 58.

Accordingly, the system of power generation 100, 200, 300 utilizes a positive pressure and a negative pressure in a contained system 100, 200, 300 to create a continuous flow of a fluid in a first direction 54 and an opposing second direction 53 to generate an electrical current, wherein the continuous flow of the fluid in the first direction 54 and the opposing second direction 53 rotates a turbine 50 in a single direction R to generate the electrical current; the turbine 50 can be continuously rotating regardless of the direction of the flow of the fluid. Thus, the pressure in system 100, 200, 300 may be an artificial pressure, as opposed to an atmospheric pressure or elevational pressure.

With reference to FIGS. 1-9B, an embodiment of a method of power generation may include the steps of providing a first vessel 10, a second vessel 20, a pump 30, and a turbine manifold assembly 80, wherein the first vessel 10 and the second vessel 20 are operably connected to the turbine manifold assembly 80, creating a positive pressure in the first vessel 10 and a negative pressure in the second vessel 20 to force a fluid in a first direction 54 through the turbine manifold assembly 80 and into the second vessel 20 to a predetermined fluid level, and after the fluid reaches the predetermined fluid level in the second vessel 20, creating a positive pressure in the second vessel 20 and a negative pressure in the first vessel 10 to force the fluid in an opposing second direction 53 through the turbine manifold assembly 80 and back into the first vessel 10 to complete a cycle. The fluid passing through the turbine manifold assembly 80 in the first direction 54 and the opposing second direction 53 may mechanically drive a turbine 50, such as through rotation/movement of one or blades of the turbine 50, of the turbine manifold assembly 80 in a single direction R, which continuously rotates a mechanical shaft or rotor of the turbine manifold assembly 80 to generate an electrical current. These steps may be repeated, or the cycle, may be repeated for continuous generation of power by the movement of fluids through a contained, pressured system using a pump, such as an air pump.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A power generation system comprising: a first vessel; a second vessel; a pump operably connected to the first vessel and the second vessel; and a turbine manifold assembly operably connected to the first vessel and the second vessel; wherein the pump creates a positive pressure in the first vessel to force a fluid in a first direction through the turbine manifold assembly and into the second vessel to a pre-determined level by a negative pressure in the second vessel; wherein, once the fluid reaches the pre-determined level in the second vessel, the pump creates a positive pressure in the second vessel to force the fluid in an opposing second direction through the turbine manifold assembly and back into the first vessel by a negative pressure in the first vessel to complete a cycle.

2. The system of claim 1, further comprising: an accumulator tank to collect an expansion of the fluid due to a temperature change, the accumulator tank being operably connected to the first vessel and the second vessel.

3. The system of claim 1, further comprising: a cooling unit operably connected to the turbine manifold assembly to regulate and maintain a consistent temperature of the fluid.

4. The system of claim 1, wherein the fluid passing through the turbine manifold assembly in the first direction and the second direction mechanically drives a turbine of the turbine manifold assembly in a single direction, which continuously rotates a mechanical shaft of the turbine manifold assembly to generate an electrical current.

5. The system of claim 1, wherein the fluid is at least one of a liquid and gas.

6. The system of claim 5, wherein the liquid is at least one of water and oil.

7. The system of claim 1, wherein the power generation system is contained and the positive pressures and the negatives pressures created by the pump is artificially created and not an atmospheric pressure.

8. The system of claim 1, wherein the pump is an air pump.

9. The system of claim 1, wherein the cycle is repeated.

10. A power generation system comprising: a first vessel; a second vessel; a first pump operably connected to the first vessel; a second pump operably connected to the second vessel; and a turbine manifold assembly operably connected to the first vessel and the second vessel; wherein the first pump creates a positive pressure in the first vessel to force a fluid in a first direction through the turbine manifold assembly and into the second vessel to a pre-determined level by a negative pressure in the second vessel created by the second pump; wherein, once the fluid reaches the pre-determined level, a positive pressure is created in the second vessel by the second pump to force the fluid in a second direction through the turbine manifold assembly and back into the first vessel by a negative pressure in the first vessel created by the first pump to complete a cycle.

11. The system of claim 10, wherein the fluid passing through the turbine manifold assembly in the first direction and the second direction mechanically drives a turbine of the turbine manifold assembly in a single direction, which continuously rotates a mechanical shaft of the turbine manifold assembly to generate an electrical current.

12. The system of claim 10, wherein the cycle is repeated.

13. A method of power generation comprising: utilizing a positive pressure and a negative pressure in a contained system to create a alternating flow of a fluid in a first direction passed a turbine and an opposing second direction passed the turbine to generate an electrical current; wherein the alternating flow of the fluid in the first direction and the opposing second direction rotates the turbine in a single direction to generate the electrical current.

14. The method of claim 13, further comprising: supplying a constant amount of fluid.

15. The method of claim 13, further comprising: directing the continuous flow of the fluid in the first direction and the opposing second direction by activating one or more directional flow valves.

16. The method of 13, wherein a rotation of the turbine in the single direction rotates a mechanical shaft operably connected to the turbine.

17. The method of claim 13, wherein the positive pressure and the negative pressure are created within a first vessel and a second vessel by one or more pumps.

18. A method of power generation comprising: providing a first vessel, a second vessel, a pump, and a turbine manifold assembly, wherein the first vessel and the second vessel are operably connected to the turbine manifold assembly; creating a positive pressure in the first vessel and a negative pressure in the second vessel to force a fluid in a first direction through the turbine manifold assembly and into the second vessel to a pre-determined level; and after the fluid reaches the pre-determined level in the second vessel, creating a positive pressure in the second vessel and a negative pressure in the first vessel to force the fluid in an opposing direction through the turbine manifold assembly and back into the first vessel to complete a cycle.

19. The method of claim 18, wherein the fluid passing through the turbine manifold assembly in the first direction and the opposing second direction mechanically drives a turbine of the turbine manifold assembly in a single direction, which continuously rotates a mechanical shaft of the turbine manifold assembly to generate an electrical current.

20. The method of claim 18, further comprising: repeating the cycle.

21. The power generation system as recited in claim 1, wherein the turbine manifold comprises a turbine configured to continuously rotate in a single direction as the fluid moves in the first direction or in the opposing second direction.

* * * * *